No. 632,627. Patented Sept. 5, 1899.
F. E. B. BEAUMONT.
VARIABLE SPEED GEAR FOR BICYCLES.
(Application filed Mar. 9, 1899.)
(No Model.)
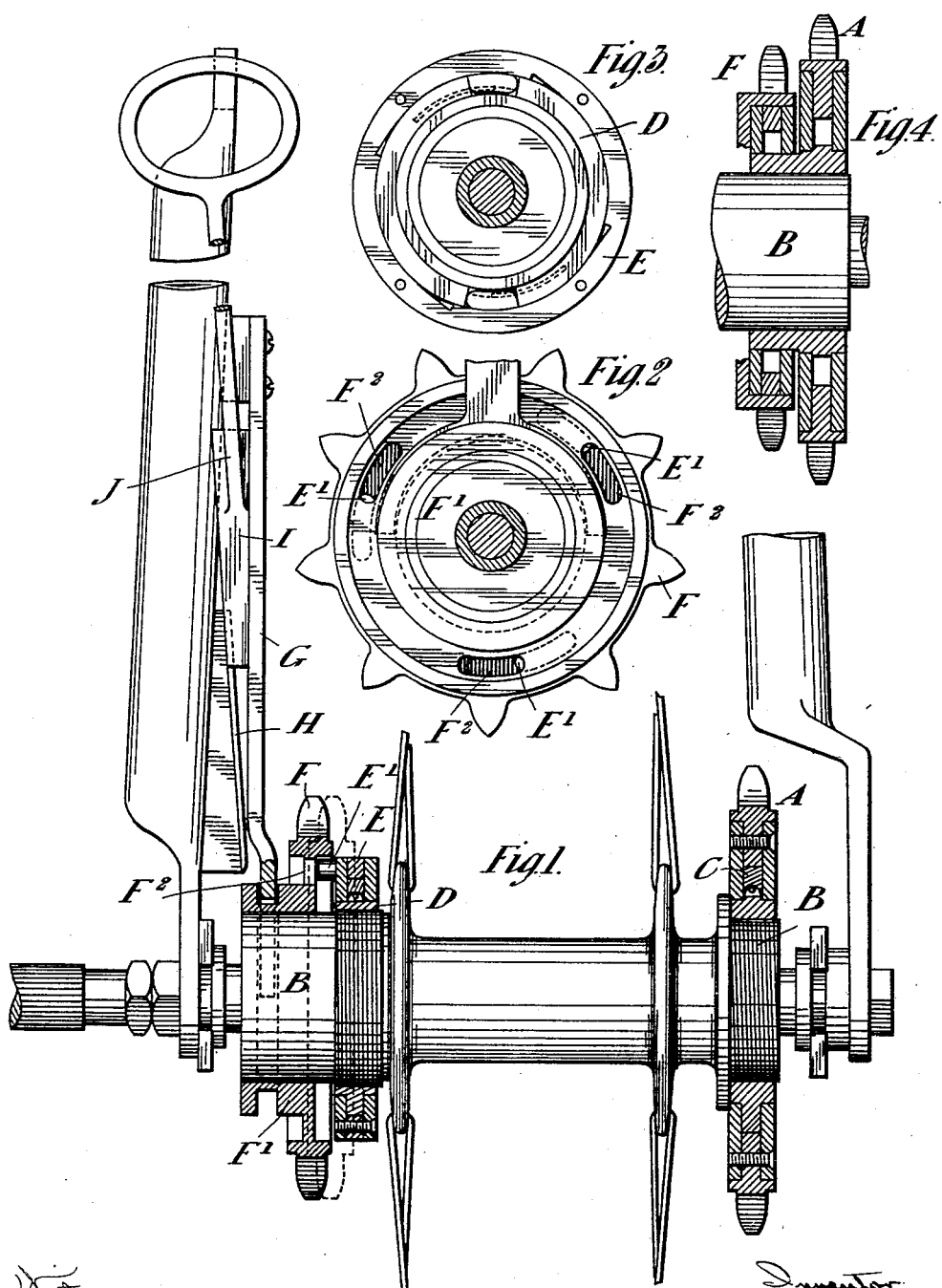

UNITED STATES PATENT OFFICE.

FREDERICK E. B. BEAUMONT, OF LONDON, ENGLAND.

VARIABLE-SPEED GEAR FOR BICYCLES.

SPECIFICATION forming part of Letters Patent No. 632,627, dated September 5, 1899.

Application filed March 9, 1899. Serial No. 708,376. (No model.)

*To all whom it may concern:*

Be it known that I, FREDERICK EDWARD BLACKETT BEAUMONT, a citizen of England, residing at St. Margarets Mansions, 51 Victoria street, Westminster, London, England, have invented certain new and useful Improvements in Variable-Speed Gear for Bicycles and other Velocipedes, (for which I have made application for a patent in Great Britain, dated November 4, 1898, No. 23,252, and in Germany, dated November 19, 1898, No. B. 23,742,) of which the following is a specification.

My invention relates to that kind of variable-speed gear for bicycles and other velocipedes wherein two sets of chain-gear are provided, one for driving at a high speed and one at a low speed. In such gear as heretofore constructed the two chain-wheels on the wheel hub or axle have either both been of ordinary construction and both mounted loose on the hub or axle, either the one or the other being coupled at will with the wheel-hub by a clutch according as it be desired to run at a quick or a slow speed, or only the high-speed chain-wheel has been arranged with a clutch connection, as above described, while the low-speed chain-wheel was connected to the wheel-hub by a ratchet-wheel connection, so that when the high-speed wheel was thrown in gear the part of the ratchet device of the low-speed wheel which was carried by the hub could run faster than the chain-wheel itself.

My present invention has for its object to do away with the necessity of having to clutch the high-speed chain-wheel directly onto the wheel-hub for running with the high-speed gear and to afford the latter the same advantage as is afforded by the low-speed gear having the said ratchet connection—namely, that of being able while running at either the one speed or the other to hold the pedals stationary while the driving-wheel continues to run freely forward. For these purposes I construct the high-speed chain-wheel as follows: I fix upon the wheel-hub the one part of a ratchet device, surrounding which is the second part of the ratchet device in the form of an intermediate ring, and in operative connection with said ring I loosely mount a toothed ring acting as a chain-wheel, and which can be clutched to or unclutched from the intermediate ring by any suitable clutch device, for the purposes which will hereinafter appear. One arrangement for this purpose is shown, by way of example, on the accompanying drawings, in which—

Figure 1 shows an elevation of the hub of a driving-wheel with the high and low speed mechanism connected thereto. Fig. 2 shows a sectional end view of the high-speed gear; and Fig. 3 shows a view of the ratchet-gear of the high-speed wheel, the toothed ring being removed. Fig. 4 is a section of a modified arrangement.

A is the low-speed chain-wheel, which is connected to the hub B of the wheel by means of ratchet-gear C, which may be of any suitable construction, but is here shown of the construction described in the specification to my application for a patent for improvements in ratchet-gear for the chain-wheels of bicycles and other velocipedes bearing equal date herewith and which need not be further described. The high-speed chain-wheel consists, first, of a ring D, fixed on the hub of the wheel, which ring, as shown in the front view at Fig. 3, has notches containing loose pawls and has fitted loose upon it a ring E, having ratchet-notches with which the said pawls are made to engage by means of springs, the ring E being held in position upon the ring D by side cheeks. This arrangement also constitutes the ratchet device described in the specification to my aforesaid application bearing equal date herewith.

In operative connection with the ring E, which I term an "intermediate" ring, is arranged a loose toothed ring F, that serves as a chain-wheel. In the example of my invention illustrated in the drawings, the toothed ring is movable laterally with relation to the ring E and is carried by a sleeve F', that runs loose on the hub B and can be slid thereon either so as to be in the position shown in full lines, in which the toothed ring is independent of the ring E, or so as to be in the dotted position, in which it is clutched to the ring E, studs E' on the latter being then made to enter holes $F^2$ in the sleeve F'. Thus when the toothed ring F is in the uncoupled position the cycle-wheel will be rotated by the slow-speed gear A C, driven by a corresponding chain-wheel on the pedal-shaft. When, on the other hand, the toothed ring F of the high-speed chain-wheel is clutched with the ring E, the cycle-wheel will be rotated by the high-speed gear D E F, driven by a second chain-wheel and chain on the pedal-shaft.

It will be seen that when running either with the high-speed gear or with the low-speed gear the pedal-shaft, and consequently the toothed rings A and F, can be held stationary while the wheel continues to run freely forward owing to the said ratchet connections, also that when the low-speed gear is in action the unclutched toothed ring F of the high-speed gear will be carried around independent of the ring E at a quicker speed than the hub and ring E, while when the high-speed gear is in action the toothed ring A, with its cheeks, will be carried around at a slower speed than the hub, this being permitted by the ratchet connection.

The throwing in and out of gear of the toothed ring F may be effected in any convenient manner. In the arrangement shown by way of example on the drawings a spring-arm G, fixed to the cycle-frame, is engaged with its forked end in a neck in the sleeve F² and normally tends to keep this and the toothed ring F in the unclutched position. On the cycle-frame is fixed an incline H, and between this and the arm G is a wedge I, to which is attached a handle J in any convenient position near the saddle, so that for throwing the quick-speed gear in action the rider merely requires to force down the wedge.

Instead of arranging the high and low speed chain-gear separate and on opposite sides of the wheel, as described, they might also be arranged side by side, as shown at Fig. 4.

Having thus particularly described and ascertained the nature of this invention and the best means I know for carrying the same into practical effect, I claim—

1. In a variable-speed driving-gear, the combination with a driving-wheel, of a loosely-mounted toothed ring, an intermediate ring, pawl-and-ratchet devices for connecting the intermediate ring with the wheel-hub, and a clutch for clutching the toothed ring to and unclutching it from said intermediate ring, substantially as and for the purposes described.

2. In a variable-speed driving-gear, the combination with a driving-wheel, having a hub, of a ring D secured to the latter, an intermediate ring E having lateral studs E', ratchet devices connecting said rings, and a toothed ring F movable toward and from the intermediate ring, having a sleeve F' loose on the wheel-hub and provided with holes F² to receive the studs on said intermediate ring when the sleeve and toothed ring are shifted toward the same, substantially as described.

In testimony whereof I have hereunto set my hand in presence of two subscribing witnesses.

FREDERICK E. B. BEAUMONT.

Witnesses:
GERALD L. SMITH,
E. GARDNER.